(12) United States Patent
Sekiguchi et al.

(10) Patent No.: US 12,554,097 B2
(45) Date of Patent: Feb. 17, 2026

(54) COMPACT ACTUATOR ASSEMBLIES FOR OPTICAL PATH FOLDING ELEMENTS

(71) Applicant: Huawei Technologies Co., Ltd., Shenzhen (CN)

(72) Inventors: Naoki Sekiguchi, Tokyo (JP); Atsushi Horidan, Tokyo (JP); Atsushi Yoneyama, Tokyo (JP); Irisawa Gentaro, Tokyo (JP)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 579 days.

(21) Appl. No.: 18/001,497

(22) PCT Filed: Jun. 12, 2020

(86) PCT No.: PCT/CN2020/095815
§ 371 (c)(1),
(2) Date: Dec. 12, 2022

(87) PCT Pub. No.: WO2021/248451
PCT Pub. Date: Dec. 16, 2021

(65) Prior Publication Data
US 2023/0228969 A1    Jul. 20, 2023

(51) Int. Cl.
G02B 7/182    (2021.01)
G02B 13/00    (2006.01)

(52) U.S. Cl.
CPC ....... *G02B 7/1821* (2013.01); *G02B 13/0065* (2013.01)

(58) Field of Classification Search
CPC .................. G02B 7/1821; G02B 13/0065
See application file for complete search history.

(56) References Cited

U.S. PATENT DOCUMENTS 10,599,896 B1 *   3/2020   Vinogradov ....... G02B 27/0972
2018/0224665 A1 *  8/2018   Im .................... G02B 27/642

FOREIGN PATENT DOCUMENTS

WO    2018122650 A1    7/2018

\* cited by examiner

*Primary Examiner* — Lucy P Chien
(74) *Attorney, Agent, or Firm* — Conley Rose, P.C.

(57) ABSTRACT

A mirror swing actuator assembly for an optical path folding element (OPFE) for compact folding camera modules comprises an exit aperture for outputting folded light rays, and an incoming aperture for receiving incoming light rays, wherein a distance between a top lens of a lens actuator and an end of the optical path folding element is minimized by configuring the second aperture and/or a support assembly of the optical path folding element to receive, within the mirror swing actuator assembly, an end portion of the optical actuator/lens assembly that comprises the top lens.

20 Claims, 13 Drawing Sheets

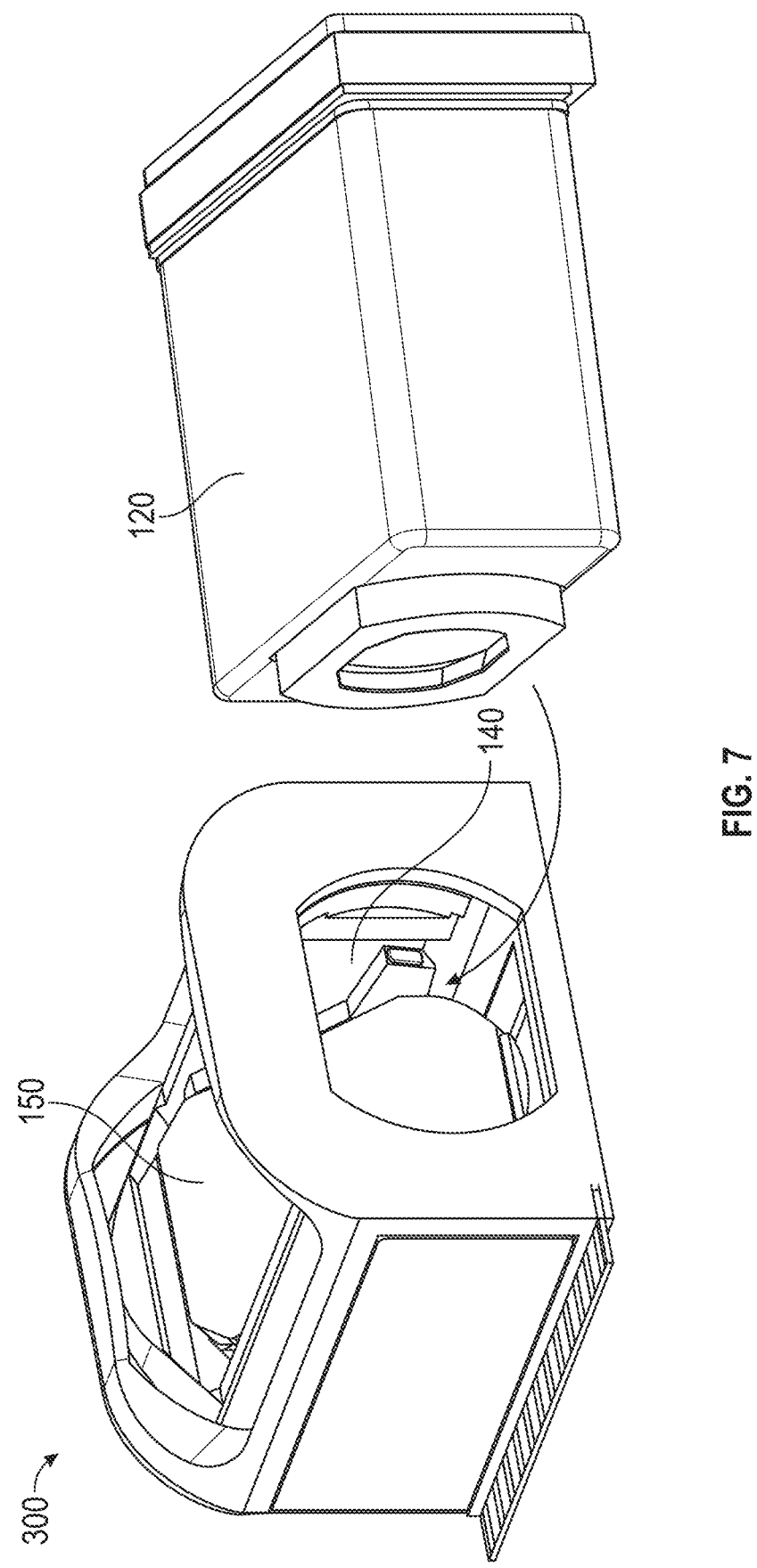

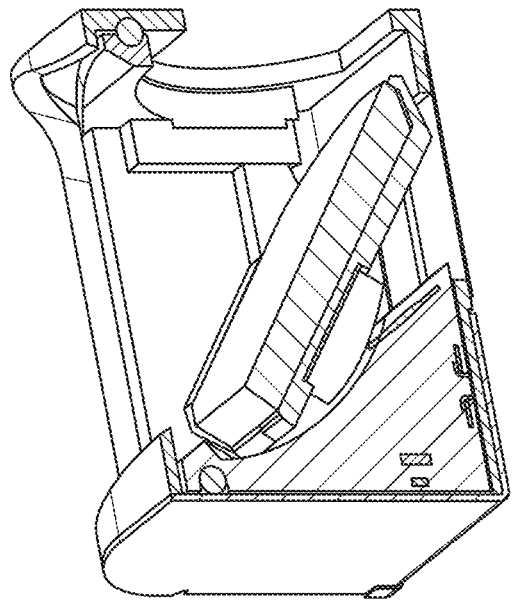
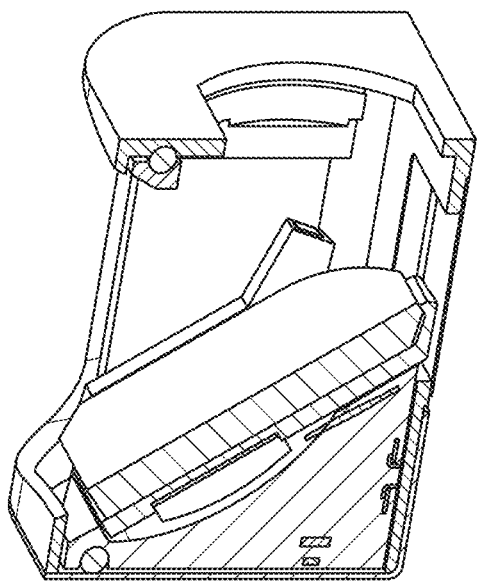
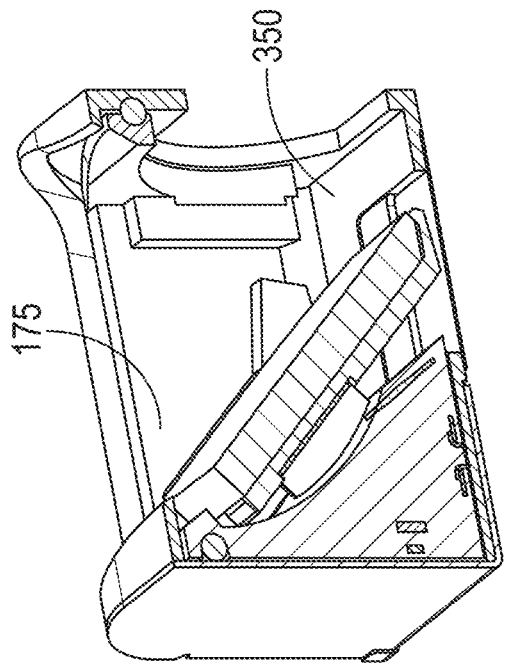
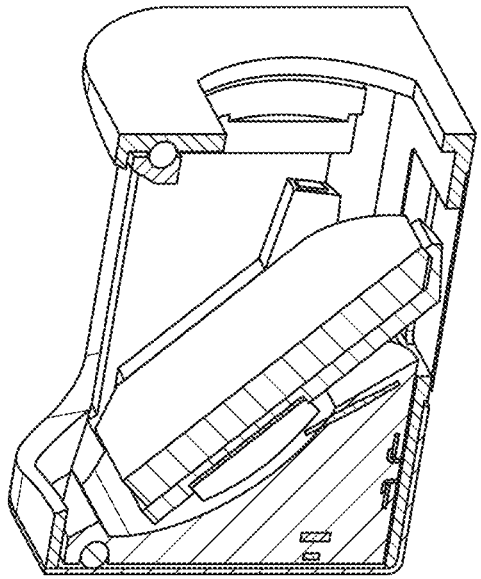
FIG. 12

COMPACT ACTUATOR ASSEMBLIES FOR OPTICAL PATH FOLDING ELEMENTS

CROSS-REFERENCE TO RELATED APPLICATIONS

This is a U.S. National Stage of International Patent Application No. PCT/CN2020/095815 filed on Jun. 12, 2020, which is hereby incorporated by reference in its entirety.

TECHNICAL FIELD

The disclosure relates to optical devices, and in particular to support and positioning mechanisms for optical devices. In more particularity, the disclosure relates to compact structures for optical devices used in portable devices such as smartphones.

BACKGROUND

Portable electronic devices, such as smartphones, may comprise one or more digital cameras.

As disclosed in patent applications WO2018122650A1 and WO2018167581A1, a compact folded digital cameras include a lens, an optical path folding element (OPFE) and an image sensor. The optical path forming element is typically a prism or mirror.

FIG. 1 shows such a known compact folded camera module. Compact refers to one or more dimensions of the camera module. A host device e.g. the smartphone imposes constraints on the size.

The folded camera module 100 comprises two parts: a mirror swing actuator 110 and a lens actuator 120. The mirror swing actuator has a first aperture 130 (i.e. opening), for passing rays of a field of view, and a second aperture 140 (FIG. 3), for passing rays folded by the OPFE 150. The OPFE is mounted within the mirror swing actuator and angled to receive incoming rays of the field of view, and transmit them to the second aperture.

Herein, the mirror swing actuator of FIG. 1 is referred to as a mirror swing actuator or mirror swing assembly.

The OPFE thus folds a first optical path along a first axis from an object or scene, into a second optical path along a second axis substantially orthogonal to the first axis. The first axis may thus correspond to the direction to the scene through the first aperture. The second axis is an optical axis of the lens. Consequentially it will be understood that the first and second apertures are or are substantially mutually orthogonal.

The OPFE can rotate about one or more axes. This movement enables the camera to obtain different viewpoints of the image or scene, which can be used in various ways such as in image stabilization or in obtaining panoramic images.

FIG. 2 shows that the mirror swing actuator of FIG. 1 enables the OPFE to rotate within a limited range horizontally (left and right) i.e. about the second axis, such as could be used to pan the camera. This is referred to herein as "horizontal swing movement".

FIG. 2 also shows that the mirror swing actuator can also enable the OPFE to swing vertically (up and down) within a limited range i.e. about a third axis orthogonal to the first and second axes. This is referred to herein as "vertical swing movement".

The lens actuator comprises a case in which is comprised at least one lens 160 (FIG. 3), such as a tele lens. The lens actuator may comprise a plurality of lens. The case may further comprise the image sensor. In use, the at least one lens first receives and focuses incoming rays folded by the OPFE.

FIG. 3 is a cross section view through the folded camera module of FIGS. 1 and 2 along the second axis. The third axis is perpendicular to the plane of the section view.

Parallel to the first axis as shown is what is termed herein a body height direction of the mirror swing actuator (labelled "height"), and parallel to the second axis is what is termed herein a body length direction. The third direction perpendicular to both is the body width direction. In the conventional mirror swing actuator, the height of the mirror swing actuator is more than 10 mm, the length is more than 13 mm, and the width is more than 15 mm.

It can be seen from FIG. 3 that the lens actuator and mirror swing actuator are adjacent when in use. In particular, an end of the lens actuator is adjacent to the second aperture of the mirror swing actuator, and is not received within the second aperture. The said end of the lens actuator holds the at least one lens 160. There is thus a distance B between the end of the lens actuator, and the OPFE. Depending on where the at least one lens is located in the lens actuator, there may be the same or other (shown as greater) distance between the at least one lens and OPFE. In the conventional mirror swing actuator, this distance is 2-3 mm. This distance corresponds to physical space which is occupied primarily by the housing of the mirror swing actuator at and around the second aperture. To a certain but generally lesser extent, the physical space is also occupied by the case of the lens actuator and/or a first sub-assembly within the mirror swing actuator on which the OPFE is mounted.

Thus as shown in FIG. 3, there is a distance, between the lens and the OPFE, as measured parallel to the second axis from an end of the OPFE at a maximum extent of vertical swing of the OPFE. Similarly there is also a distance between the end of the lens actuator and an interior surface of sub-assembly, which may correspond approximately to a maximum extent of vertical swing of the OPFE.

FIGS. 4a and 4b are opposing end perspective views of the first sub-assembly 170 of the mirror swing actuator of FIGS. 1-3. FIGS. 4a and 4b show that first sub-assembly, like the housing of the mirror swing actuator, has corresponding first 130-sa and second apertures 140-sa. The apertures are generally rectangular in shape. In cross-section, the first sub-assembly is generally rhombic or shaped like an elliptical cam, with the shorter dimension corresponding to the body height direction when the first aperture of the first sub-assembly and housing fully align. Thus considerable space is occupied.

Also visible in FIGS. 4a and 4b are the corresponding mechanical structures that enable the horizontal rotation of the OPFE about the second axis.

In FIG. 4a, this is achieved by a single central pivot point 190. This is achieved by a nub which cooperates with a receiving indent (not shown) in the mirror swing actuator to form the central pivot point. The location of the nub coincides with the second axis, or axis through the central gravitoid. Thus the first sub-assembly is centrally located in the mirror swing actuator, with the housing of the mirror swing actuator surrounding it. This is particularly noticeable in the body height direction.

In FIG. 4b, a different structure is used, comprising three pivot points 200 comprising ball bearings and arc-shaped grooves along a circular path about the second aperture. The circular path forms a flange which protrudes along the second axis and is received by the housing.

As the OPFE is—in this dimension—rigidly mounted on the first-assembly, rotation of the OPFE is achieved by rotation of the first sub-assembly as a whole.

FIGS. 5a and 5b are end views corresponding respectively to the views in FIGS. 4a and 4b. In FIG. 5b, it can be seen that the second aperture in the first sub-assembly is rectangular and located centrally about the second axis. The second aperture in the first sub-assembly is surrounded by a circular rim 210, on which the three pivot points are spaced equidistantly, which correlates to approximately 120 degrees between each of the three pivot points. To illustrate what is meant, this is shown by the double headed arrow between two of the pivot points. The combination of the single central pivot point and the three pivot points equally spaced enables rotation.

FIG. 6a is a perspective view of the OPFE 150 mounted on the second sub-assembly 180. FIG. 6b is a corresponding side view. The second sub-assembly (shown in solid black) comprises a mirror holder, on which the OPFE is mounted, and side walls 220 protruding from each side above the mirror holder, and above an upper surface of the OPFE. On an extending arm of each side wall there is a pin structure which is received by the first sub-assembly to form a pivot, coincident with the third axis (shown as a dotted white line), which thus enables the vertical swing movement of the OPFE.

SUMMARY

The disclosure provides in one aspect an actuator assembly for an optical path folding element, which is more compact in one or more dimensions compared to a conventional mirror actuator assembly, thus saving space required for installation. This is particularly beneficial, but not limited to, portable electronic devices comprising optical devices, such as mobile phones with camera modules. In particular, a body height dimension of the actuator assembly is substantially reduced which enables a corresponding dimension such as thinness in a host device to be made less.

The disclosure further provides other aspects and implementation forms of an actuator assembly, each of which may function together with, or wholly independently to, each other, as well as the said space saving aspect. This may apply, in particular but not only, to the location and distribution of force-balancing pivot points, aspects related to location of the third rotation axis, and reducing the protrusion of parts above a reflection surface of the OPFE.

In a first aspect there is provided an actuator assembly for an optical path folding element (OPFE), comprising
an actuator assembly housing having a first aperture and a second aperture,
wherein
the first aperture is for passing light rays of a field of view, and
the second aperture is for passing light rays folded by the optical path folding element;
wherein
the actuator assembly housing is configured to receive an end portion of an optical actuator within the second aperture,
wherein the optical actuator comprises at least one lens located within the end portion;
and
a first sub-assembly, for mounting thereon the optical path folding element, and which is configured to provide movement to the optical path folding element.

An actuator assembly may correspond in function to a conventional mirror swing actuator. Thus the definitions and explanations in the Background section concerning the conventional mirror swing actuator may apply to the actuator assembly of the first aspect except where otherwise provided.

The actuator assembly may further comprise an optical actuator such as a lens assembly, with or without image sensor. The optical actuator may be a conventional (known) optical actuator, having at least one lens.

Compared to conventional mirror swing assemblies, the actuator assembly housing is configured such that an end of the optical actuator is received within the second aperture of the actuator assembly housing. As the second aperture may open through the housing, there will be an associated thickness of the housing which comprises the second aperture. To be within the second aperture, the end portion may penetrate and terminate within this thickness of the second aperture, or (as in other implementation forms) penetrate and terminate at any position inwardly of the second aperture.

As such end portion preferably comprises the at least one lens, this means that not only is the size of the combined actuator assembly and the optical actuator reduced in the body length direction, but also the lens is brought closer to the OPFE. In other words, the distance B shown in FIG. 3 is reduced, which may be more than 50% reduced compared to conventional mirror swing actuators.

By bringing the end portion increasingly within the second aperture, the distance B may be correspondingly reduced.

Bringing the lens in the end portion within may also provide other advantages, such as contributing to improving the width and/or height of the OPFE. For example, the width and height of the OPFE could be reduced because the lens is brought closer. These improvements may enable reductions in the corresponding dimensions of the actuator assembly housing, as well as reducing the length. In embodiments of the disclosure, the length of the actuator assembly housing may be less than 12 mm, the width less than 13 mm, and the height less than 9 mm, which correspond to more than 8%, 13%, and 10% reductions compared to conventional mirror swing actuators.

In an implementation form, the first sub-assembly is configured to provide movement by being rotatably mounted, relative to the actuator assembly housing, about an axis of the second aperture.

The first sub-assembly may provide rotable movement by any suitable means.

In an implementation form, a cavity of the actuator assembly housing extends along an or the axis of the second aperture into the actuator assembly housing and away from the second aperture, the cavity of the actuator assembly housing is configured to receive the end portion of the optical actuator.

Herein, the or a second axis may be coincident.

The actuator assembly housing may be perceived as substantially a shell, having first and second apertures and an internal cavity connecting the first and second apertures. The OPFE is located within the cavity and mounted on the first sub-assembly within the shell.

By being received within the housing, more than just a comparatively small part of the end portion (and hence lens) is brought closer to the OPFE, thus further reducing distance B.

In an implementation form, the cavity of the actuator assembly housing is sized and/or shaped such that when the end portion of the optical actuator is received within the cavity, the at least one lens of the end portion of the optical actuator is brought into a position that is proximal to the optical path folding element.

Herein, the terms received and inserted may be used interchangeably to refer to the bringing of the end portion of the optical actuator into its in-use position relative to the actuator assembly housing.

The cavity may have a suitable size and shape to accommodate conventional optical actuators. For example, to have a suitable size, the dimensions of the cavity should at least be larger than the corresponding dimensions e.g. radius of the end portion. To be shaped, the shapes must be compatible e.g. both circular. These are just examples, other shapes can be used. The relevant parts of the cavity may closely follow the relevant corresponding part of the end portion to match up and thus provide support.

The skilled person will understand that proximal in the context of the end portion and the OPFE may refer to bringing the lens towards and as close as possible to the OPFE. This may be measured between the closest points of each or otherwise. A closest point of one may refer to an end surface of the OPFE, which may belong to an active area. A closest point of the other may refer to an outer surface of the lens or the centre of the lens or otherwise. Proximal may be the distance that is minimal, or in a certain range, or less than a certain distance compared to conventional mirror swing assemblies—for example, the distance between the lens and the OPFE may be less than 1 mm, compared to 2-3 mm in conventional mirror swing actuators.

In an implementation form the first sub-assembly is rotatably mounted about an or the axis of the second aperture by a first sliding mechanism located in a region between an interface zone of the first sub-assembly and an interface zone of the actuator assembly housing.

The interface zone of the first sub-assembly and the interface zone of the actuator assembly housing provide a support structure for the first sliding mechanism. The interface zones are in close proximity, such that by being disposed in the region the first sliding mechanism can enable sufficiently low-friction rotation of the first sub-assembly relative to the actuator assembly housing within which the first sub-assembly is located.

In an implementation form the said region is located outward of the second aperture and proximal to an inner edge surface of the second aperture.

The first sliding mechanism is close to the inner edge surface of the second aperture. This may contribute to minimizing unnecessary height of the actuator assembly housing.

The inner edge surface may be for abutting, or providing potential support for the end portion of the optical actuator. Outward refers to a general direction away from the second aperture, such as radially outwardly or directions at an angle thereto. The inner edge surface of the second aperture may constitute a part of the actuator assembly housing that is for receiving the end portion. Thus the region is outward of that, and may be comprised in a flange. Compared to conventional mirror swing actuators, the height of the flange may be reduced which contributes to reducing the size (height) of housing. In conventional mirror swing actuators, a radial distance from the centre of the second aperture to the innermost part of corresponding first sliding mechanism is about 3.78 mm, and the distance to the outermost part of corresponding first sliding mechanism is about 4.9 mm: compared to these, the embodiments of the invention may provide smaller radial distances.

In an implementation form the said region is located outward of the second aperture such that when the optical actuator is received, the at least one lens of the end portion of the optical actuator is in a same plane or inwardly of the first sliding mechanism.

Same plane may refer to being in substantially the same plane. Inwardly may refer to a direction as measured along the second axis.

In the described structure, the first sliding mechanism may be the most distal part which defines an end of the first sub-assembly in the body length direction. Thus the at least one lens is within the housing or within the first sub-assembly respectively.

In an implementation form the first sub-assembly comprises a receiving member having a size and/or shape which complements the size and/or shape of the end portion of the optical actuator.

This implementation form enables the end portion to be brought even further within the cavity of the actuator assembly housing, since the receiving member of first sub-assembly has a size and shape suitable for receiving the end portion. This enables the at least one lens to be brought even closer to the OPFE.

In an implementation form the size and shape of the receiving member of the first sub-assembly is such that on receiving the end portion of the optical actuator by the receiving member, the receiving member only partially surrounds the end portion of the optical actuator.

Surrounding may refer to surrounding when considered in a cross-section perpendicular to the axis of the second aperture.

By only partially surrounding, excess material of the sub-assembly can be eliminated, making the sub-assembly more compact in the height and/or width direction.

Further, by only partially surrounding, the first sub-assembly may form an opening (facing a side of the housing assembly opposite to the side having the first aperture) in the first sub-assembly through which a segment of the end portion of the optical actuator protrudes radially outwardly with respect to the axis of the second aperture. This cooperating design may also contribute to reducing height of housing since the (lower) part of the first sub-assembly is missing relative to the conventional mirror swing actuator, thus the space saved from removing the bottom part may be used to receive the end portion. Hence overall height is reduced.

The at least one lens may be mounted on the segment.

The receiving member may have a suitable size and/or shape on the insider for cooperating with the end portion.

The outer surfaces of the receiving member may conform to a matching inner surface of the housing.

The inner surface of the receiving member receives the end portion of the optical actuator.

The receiving member may be generally cylindrical shaped, at least on upper and lateral sides. The upper side is towards the housing where the first aperture is located, the lower side is the opposite side thereto, the lateral sides span between the upper and lower sides. The receiving member may be a continuous segment of arc spanning approximately 180 degrees or just over, to allow 90 degree separation of ball bearings which comprise the first sliding mechanism i.e. apices of a triangle.

Preferably both inner and outer surfaces of the receiving member are continuous segment of arc, with a greater inner radius than the radius of the end portion.

Opening in the first sub-assembly is preferably located on the lower side of the first sub-assembly.

The or another opening in the first sub-assembly may extend parallel to the axis of the second aperture towards an OPFE mounting part of the first sub-assembly, for accommodating sliding movement of the OPFE along the segment of arc (see claim 14 below).

The housing may also have an opening wholly or partially overlapping the opening of the first sub-assembly on the lower side. This may be useful for accommodating sliding movement of the OPFE along the segment of arc, as disclosed below.

The cavity of the housing may be substantially cylindrical.

An external surface of the end portion of the optical actuator may have a shape of a shaft or a substantially cylindrical shell.

In an implementation form the second aperture is located in a body height side of the housing such that the second aperture is closer to a side of the housing which is opposite to the first aperture.

The side of the housing may be the lower side of the housing. By locating the second aperture closer towards the lower side, the height of the housing in the body height direction may be reduced and/or may enable the optical actuator to be mounted flush in the host device, thus reducing height both of the actuator assembly housing and also the optical actuator.

This may also be perceived, e.g. in an embodiment, as moving the second axis (the axis of the second aperture) towards the lower side compared to the conventional mirror swing assembly. The distance between the lower side of the housing and the end portion is comparatively shorter than the distance between the upper side of the housing and the end portion.

This may also be perceived as the shell of the housing having an off-centre (in the body height direction) second axis.

The first sub-assembly may be located suitably in the housing to facilitate the reduction in height.

In an implementation form the second aperture opens through a body height side of the housing, which thereby comprises a surrounding frame having an upper rim and a lower rim, wherein a height of the upper rim is greater than a height of the lower rim.

The difference in height of the rims may similarly contribute, as described above, to reducing the height.

The upper and lower rim may be joined to form an encircling rim. Either or both of the rims may assist in supporting the optical actuator. As the first sub-assembly may only partially surround the end portion, such as not around a lower part of the end portion, the lower rim of the housing may be particularly useful in supporting the end portion.

In an implementation form the interface zone of the first sub-assembly comprises an arc segment of the first sub-assembly that wholly or partially surrounds the end portion of the optical actuator.

The interface zone may be an arc segment when viewed in a cross-section perpendicular to the axis of the second aperture.

The arc segment may constitute an end of the first sub-assembly in the body length direction. The other end is for mounting the OPFE.

The arc segment may be a completely encircling arc.

Preferably, the arc segment is only a segment of arc which partially surrounds the end portion. An inner surface of the arc segment may be adapted in size and/or shape to correspond to the size and/or shape of the end portion.

Preferably, the arc segment partially surrounds a surface of the end portion that faces generally towards the upper side of the housing.

In an implementation form a second sliding mechanism is provided for further enabling the first sub-assembly to be rotatably mounted about the axis of the second aperture, wherein the second sliding mechanism is located between the actuator assembly housing and an end of the first sub-assembly spaced from the first sliding mechanism.

The second sliding mechanism cooperates with the first sliding mechanism.

In an implementation form the first and/or second sliding mechanism each comprise at least three pivot points.

Herein a pivot point is a mechanical structure providing load bearing functionality and enables movement in a constrained path. It provides smooth movement between the actuator assembly housing and first sub-assembly along the arc segment.

Using three pivot points in the second sliding mechanism provides greater stability compared to one central pivot point. Preferably, three pivot points are used for both sliding mechanisms. When considering the first sub-assembly as a rotatable cylinder mounted at its ends, providing three pivot points at each end balances forces and hence improves stability.

In an implementation form a pivot point comprises a ball bearing and respective interfacing groove, and in the first sliding mechanism the pivot points are distributed around the arc segment of the first sub-assembly at approximately equal spacing from each other in succession.

A ball bearing and interfacing groove for the ball bearing may implement the functionality of the pivot point. Other types of structures that have similar functionality may be interchangeably used. Pivot points may be understood as force-balanced points.

Further, various shapes of the interfacing groove are known to the skilled person.

The second sliding mechanism may also comprise the same structure.

In the conventional mirror swing assembly, the pivot points are spaced equally between each of the pivot points in succession around the whole annulus. In comparison, in this implementation form the pivot points are mounted in succession around the arc segment.

By using an arc segment (not complete) that only partially surrounds the end portion, height is saved. By using pivot points equally spaced along the arc segment, height is still saved and the force-balancing is optimal within the constraints.

In an implementation form the arc segment of the first sub-assembly subtends an angle of approximately 180 degrees about the axis of the second aperture, and the pivot points are distributed around the arc segment at approximately 90 degree intervals.

In the conventional mirror swing assembly, the pivot points are spaced at 120 degrees, requiring a larger arc segment.

By placing at approximately 90 degrees, the pivot forms a triangle which permits force balancing. This limits the creation of unequal forces on the first sub-assembly, which may arise during movement of the first sub-assembly such from manufacturing tolerances or shear/non solid rotation which could cause the first sub-assembly to become unstable.

The arc segment should extend over at least 180 degrees, but not much more. In practice it is most likely slightly more for stability and ease of manufacturing. The arc segment does not have to be continuous although it may be.

In an implementation form the pivot points of the first and second sliding mechanisms are configured to form mirror images of each other.

This enables even better force balancing.

Mirror images may mean that each of the pivot points of the sliding mechanisms has a position which, when projected onto a plane perpendicular to the second axis, has a same respective angular degree relative to the second axis.

In an implementation form the first sub-assembly further comprises a second sub-assembly for mounting thereon the optical path folding element (OPFE),
- wherein the second sub-assembly is slidably mounted on and relative to the first sub-assembly along a path that forms a segment of arc, and
- a rotational axis of the segment of arc is substantially perpendicular to the axis of the second aperture.

In the conventional mirror swing actuator, due to vertical swinging movement of the mirror, the mirror size is a factor to determine the height of the mirror swing actuator. Further, in the conventional mirror swing actuator, the mirror holder has 2 pins to define the vertical rotational axis mechanically.

The mirror can swing between two extremes (and intermediate positions). A position where the mirror is more parallel to the second axis is also the position where the mirror is closest to the second aperture.

The mirror is better to be closer to the lens as much as possible to minimize its size when the mirror swings towards this position. Interference with or obstruction of the incoming light path through the first aperture by structures within the housing is unlikely.

On the other hand, when the mirror swings towards the other position, the mirror needs to be a bit farther from the lens in order for the light path through the first aperture not to interfere to the actuator body, in particular the first sliding mechanism.

This means that the position of the vertical rotational axis is a factor to the optical performance and also the actuator size (especially the height).

However, the position of the mechanical rotational axis (provided by the pins) directly affect the height of the mirror swing actuator.

By slidably mounting the OPFE to move along the segment of arc, the height of the actuator assembly housing is substantially reduced.

In an implementation form there is no physical connection between the rotational axis and the first and/or second sub-assembly.

This may be understood as meaning that the rotational axis is virtualized. In particular, because the OPFE is fixed on and able to slide on the segment of arc provided by the sub-assembly, there is no need of pivot points provided by the pins. There is no physical hinge to the rotational axis from the sub-assembly.

Further, this enables further improvements, including any one or more of:
- avoiding projection of material above the OPFE surface, thus avoiding reflections;
- reduction of dimensions of housing, particularly height; and/or
- flexible selection of differently shaped segments of arc.

In an implementation form the second sub-assembly is mounted slidably, relative to the first sub-assembly, by a third sliding mechanism located between the first sub-assembly and the second sub-assembly at each side of the second sub-assembly.

In the conventional mirror swing actuator, the movement is provided by a hinged platform with pins that project above the OPFE surface, causing reflections.

In an implementation form the third sliding mechanism comprises, on each lateral side of the second sub-assembly, a set of at least two ball bearings and respective interfacing grooves.

In the conventional mirror swing actuator, the movement is provided by a hinged platform which flips up and down. By providing slidable movement e.g. along a cooperating curved surface, movement is smoother, more precise, and less prone to vibrations.

The structure of the third sliding mechanism may be similar to the first and/or second sliding mechanisms. The interfacing grooves may align along an analogous path to the path of the segment of arc.

In an implementation form the third sliding mechanisms are located at least flush or below a surface of the second sub-assembly which is for receiving the optical path folding element.

A surface of the second sub-assembly may receive the OPFE.

Avoiding or reducing any surface of the second sub-assembly from protruding above the OPFE reflection surface can be achieved by either: the OPFE reflection surface extends across the width of the housing internally, or if there is a lip around the edge of the second sub-assembly, its height is such that it does not protrude above the OPFE reflection surface.

Since the third sliding mechanism is at the side, or especially if below, unwanted reflections from protruding sides can be reduced or eliminated. Further, if provided below, the width may be reduced.

In an implementation form the first sub-assembly comprises an arc-shaped portion for receiving thereon the second sub-assembly, the arc-shaped portion being shaped to enable the movement of the second sub-assembly along the path that forms the segment of arc.

This provides a specific way of how the movement along the segment of arc occurs without using the hinges and mechanically-connected axis of the conventional mirror swing actuator.

In an implementation form the first sub-assembly comprises an aperture in a rear side of the first sub-assembly for accommodating movement of the second sub-assembly along the segment of arc.

The rear side may be opposite to the side of the housing having the first aperture. Put another way, the rear side may be close to the lower side of the housing.

By removing excess material to accommodate movement, the height of the first sub-assembly and hence the housing can be reduced.

In an implementation form the first sub-assembly comprises two walls extending along the sides of the actuator assembly housing, wherein the arc-shaped portion for receiving thereon the second sub-assembly is located towards one end of the two walls, and the other end of the two walls forms the receiving member of the first sub-assembly.

This improves space utilization within the cavity of the housing.

The first sub-assembly may comprise one or more mechanical stoppers for limiting range of movement of second sub-assembly.

In an implementation form the first and/or second sub-assembly is configured for mounting the optical path forming element thereon such that no or substantially none of the first and/or second sub-assembly protrudes beyond a reflective surface of the optical path forming element.

This reduces unwanted reflections from the protruding parts in the conventional mirror swing actuator.

In an implementation form the first and/or second sub-assembly is configured for mounting the optical path forming element thereon such that no or substantially none of the first and/or second sub-assembly protrudes beyond a reflective surface of the optical path forming element in an active area.

The active area may comprise a region of the optical path forming element that is for receiving and folding incoming light rays. The active area may vary depending on the position of the OPFE relative to the first aperture.

Thus the embodiments of the disclosure provide a mirror swing actuator assembly for an optical path folding element, comprising an exit aperture for outputting folded light rays, and an incoming aperture for receiving incoming light rays, wherein a distance between a top lens of the optical actuator/lens assembly and an end of the optical path folding element is minimized by configuring the second aperture and/or a support assembly of the optical path folding element to receive, within the mirror swing actuator assembly, an end portion of the optical actuator/lens assembly that comprises the top lens.

The compact mirror swing actuator may be deployed in a small scan camera module. This can be used not only for the smartphone, but also some products which need small camera module like drones, toys.

BRIEF DESCRIPTION OF DRAWINGS

FIG. 7 is a possible implementation of the actuator assembly according to the disclosure;

FIG. 12 is a series of four cut-away perspective views showing sliding movement of a possible implementation of the second sub-assembly and OPFE according to the disclosure;

It will be understood that generally the Figures are schematic.

DETAILED DESCRIPTION

FIGS. 1-6 inclusive relate to conventional mirror swing actuators and lens actuators, and reference is made to the Background section for a detailed discussion.

Herein, the same reference signs are used for features that are functionally or structurally similar.

Further, reference signs that end in 5 may be improved versions of the features of reference signs used for the conventional mirror swing assembly. For example, 170 refers to a known first sub-assembly; 175 refers to a first sub-assembly according to the disclosure.

A general concept of the disclosure can be seen in FIG. 7. Therein, a conventional lens actuator 120 can be inserted, as shown by the black arrow, into an actuator assembly 300 according to the disclosure.

The actuator assembly enables the part of the lens actuator 120 that has the top lens into the actuator assembly to be brought, via the second aperture 140, into the actuator assembly to varying extents. This has the effect of bringing the top lens successively closer to the OPFE 150 and hence contributing to successively reducing the height of the actuator assembly.

Figure 8:
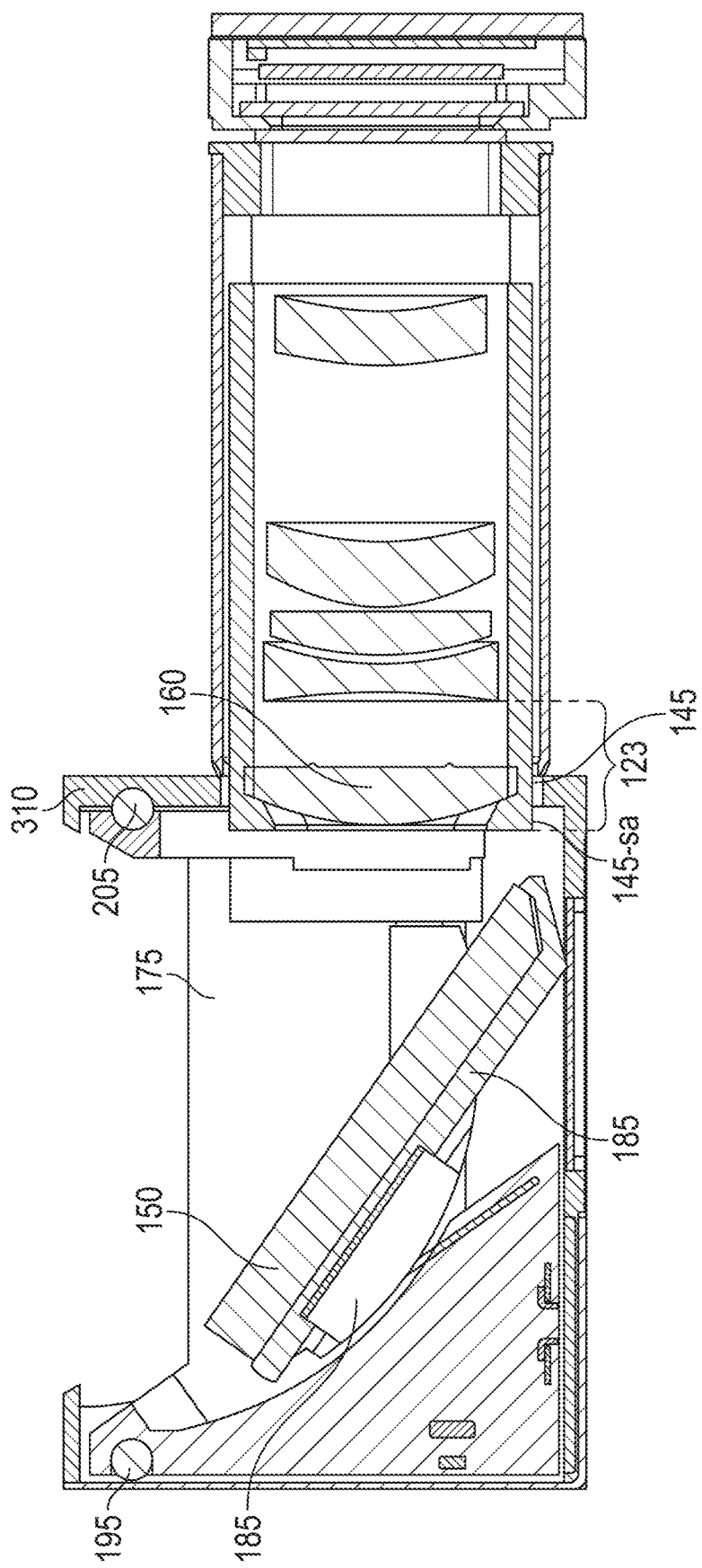
FIG. 8 is a possible implementation of the actuator assembly according to the disclosure.

FIG. 8 is a cross-section through the actuator assembly 300 and lens actuator 120 when received within the actuator assembly 300, such as in-use.

The OPFE 150 is mounted on a second sub-assembly 185, which in this embodiment comprises a platform (FIG. 8: shown as light gray) beneath the OPFE, which in turn has a structure (shown as solid black) configured to slide along a concave track of the first sub-assembly. In this embodiment, the OPFE is shown at a possible maximum extent of vertical swing movement which brings the OPFE nearest to the second aperture 145.

Figure 1:
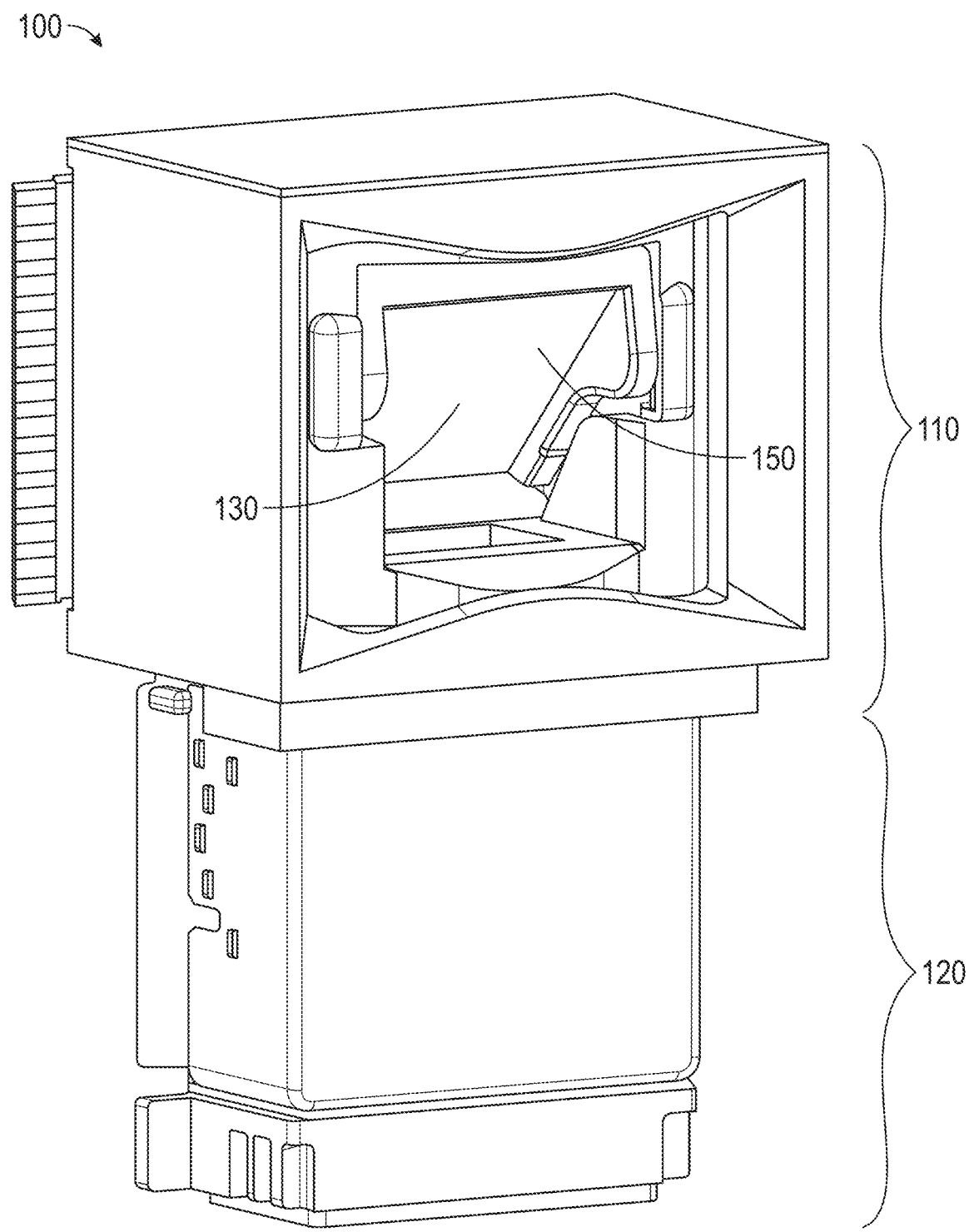
FIG. 1 shows a known compact folded camera module.
Figure 2:
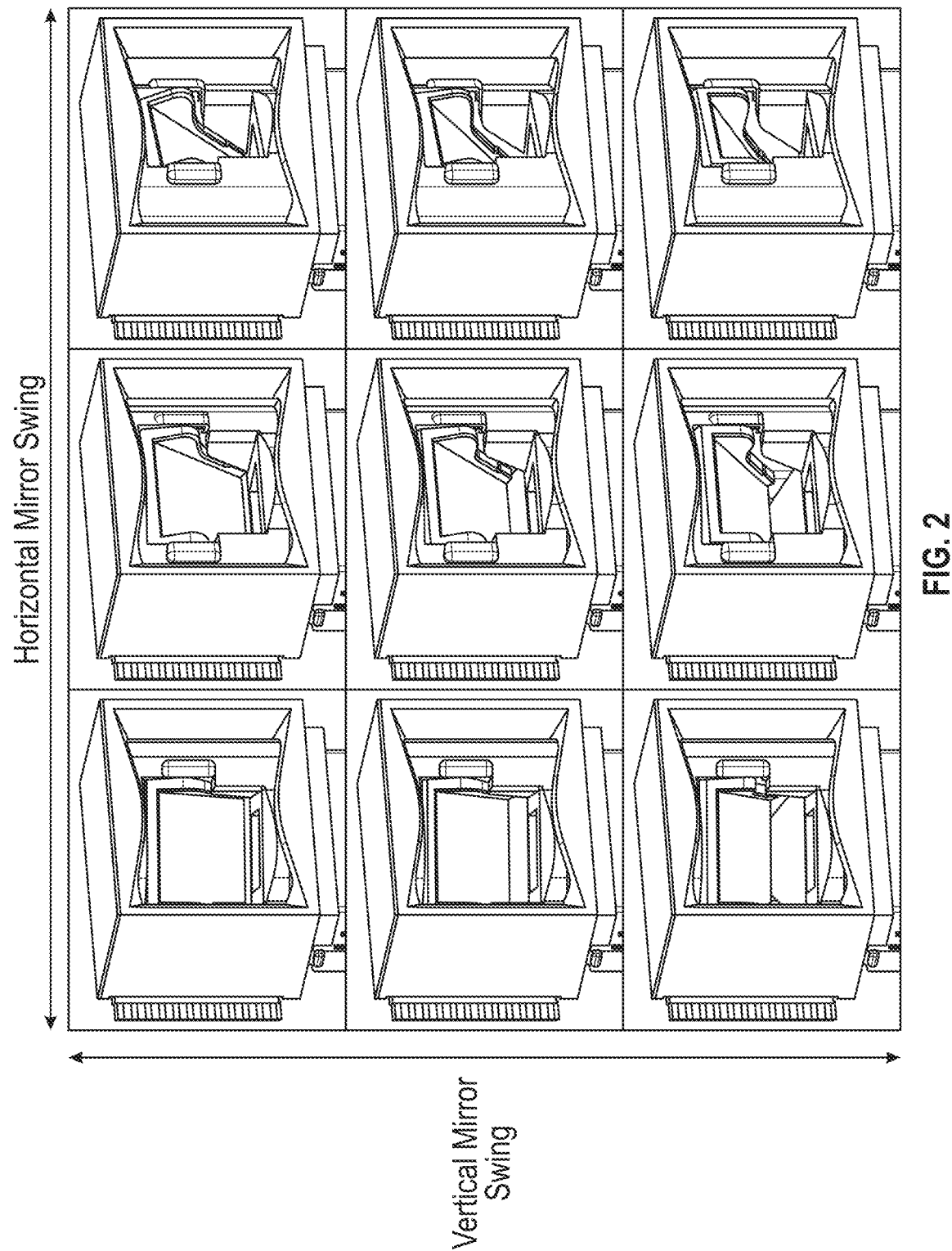
FIG. 2 shows independent vertical and horizontal rotation positions of the mirror of the known compact folded camera module of FIG. 1.
Figure 3:
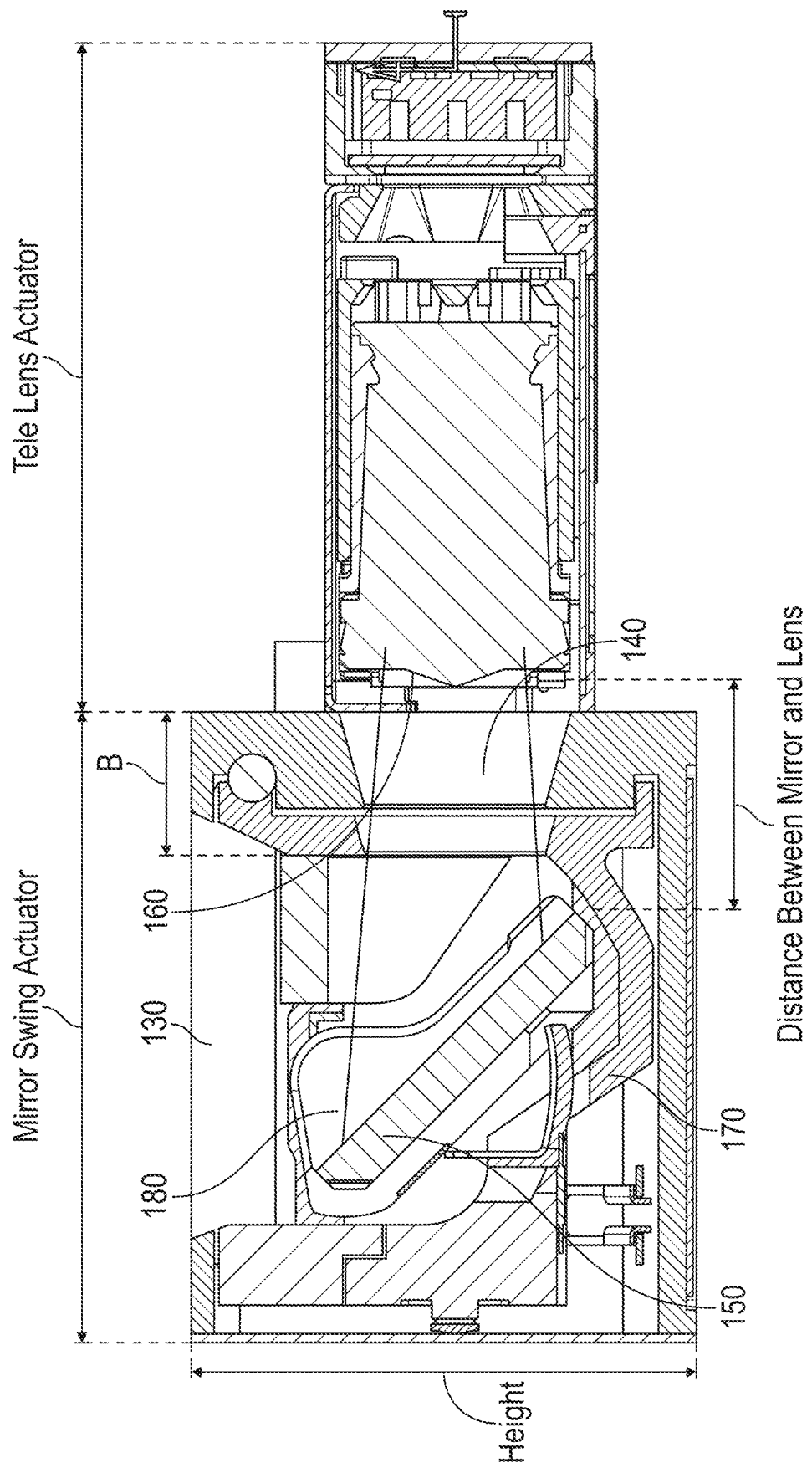
FIG. 3 is a cross section view through the folded camera module of FIGS. 1 and 2 along the second axis.
Figure 4A:
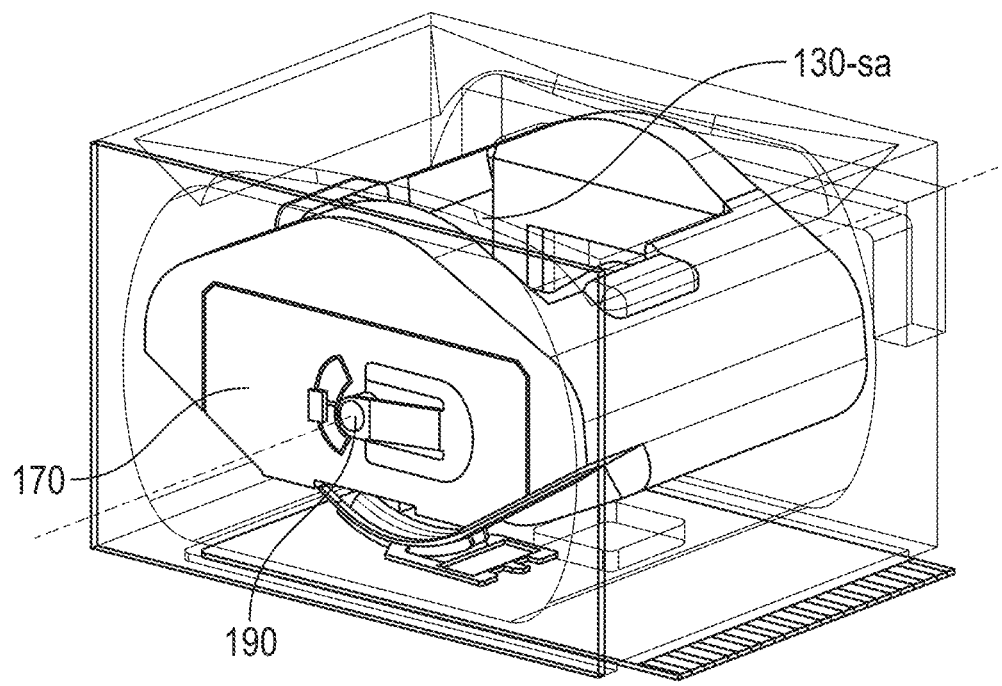
FIGS. 4a and 4b are opposing end perspective views of the first sub-assembly of the mirror swing actuator of FIGS. 1-3.
Figure 4B:
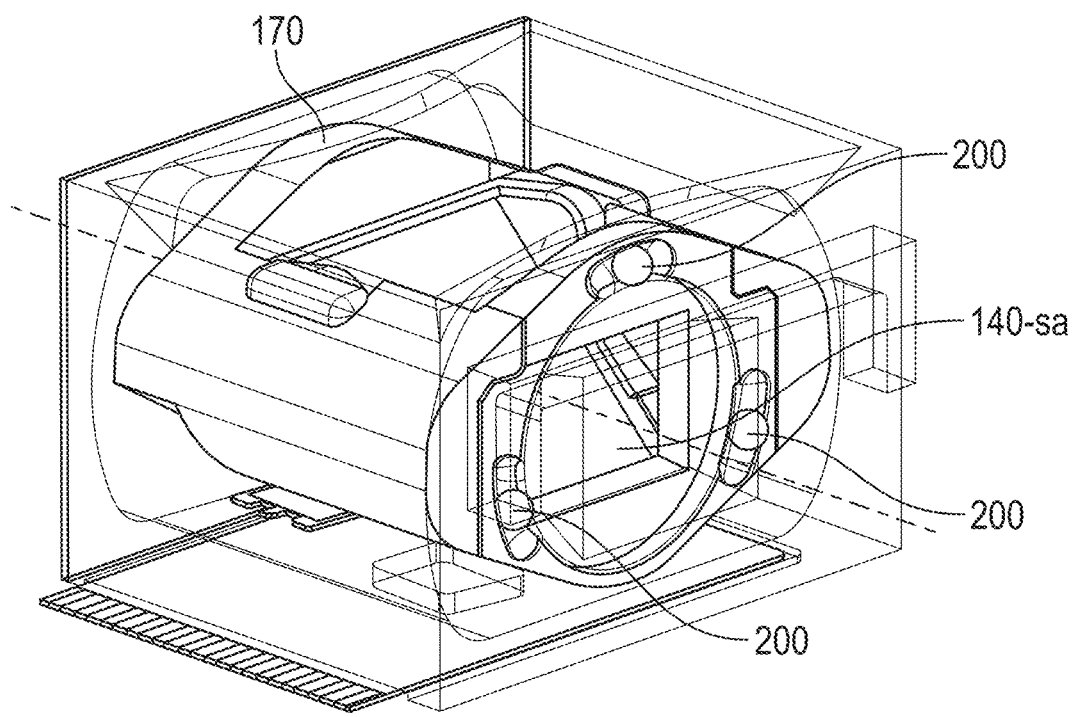
Figure 5A:
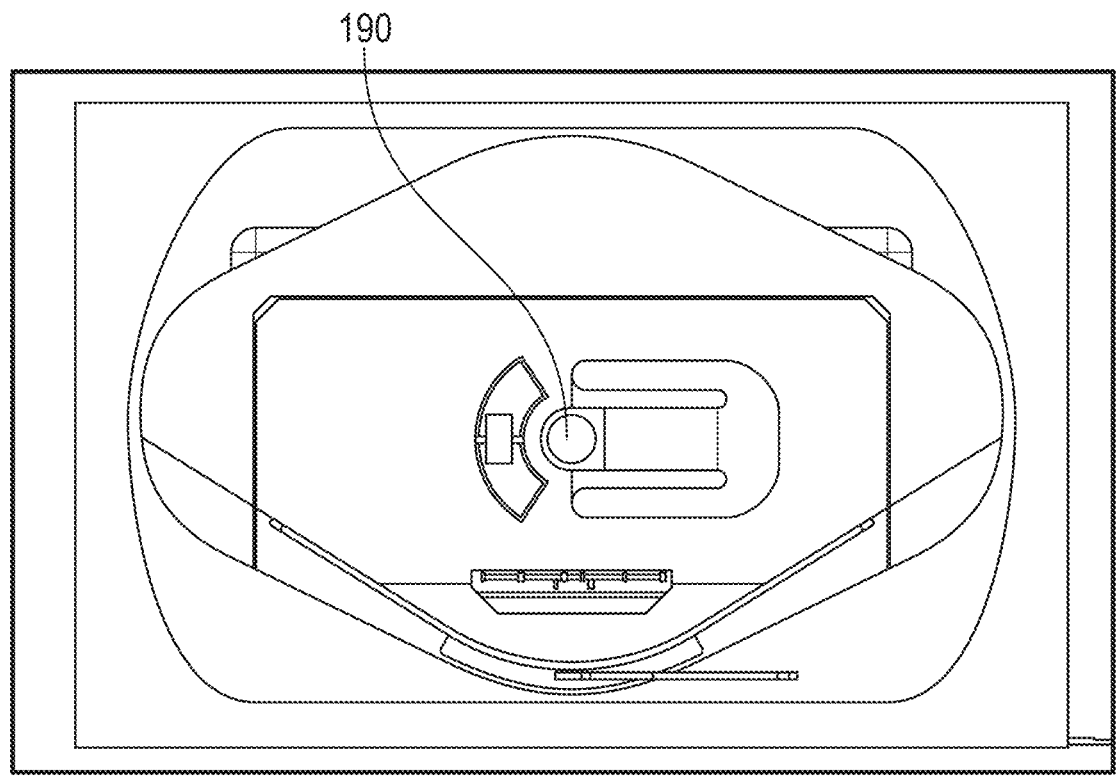
FIGS. 5a and 5b are end views corresponding respectively to the views in FIGS. 4a and 4b.
Figure 5B:
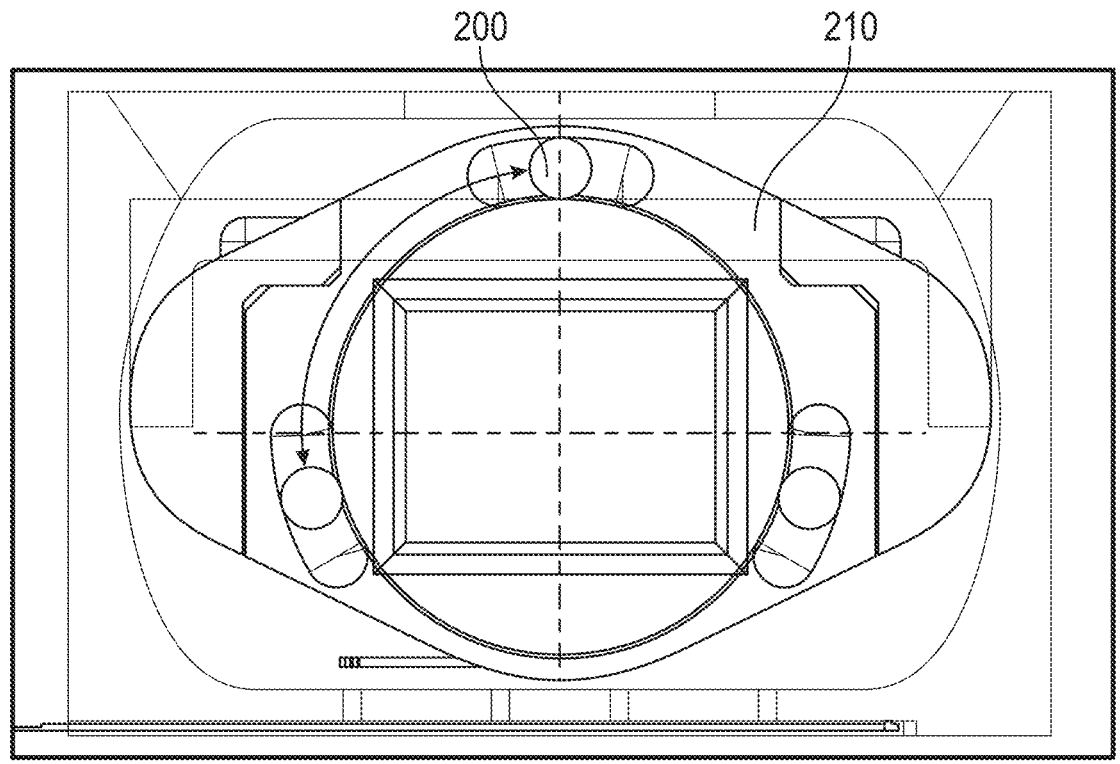
Figure 6A:
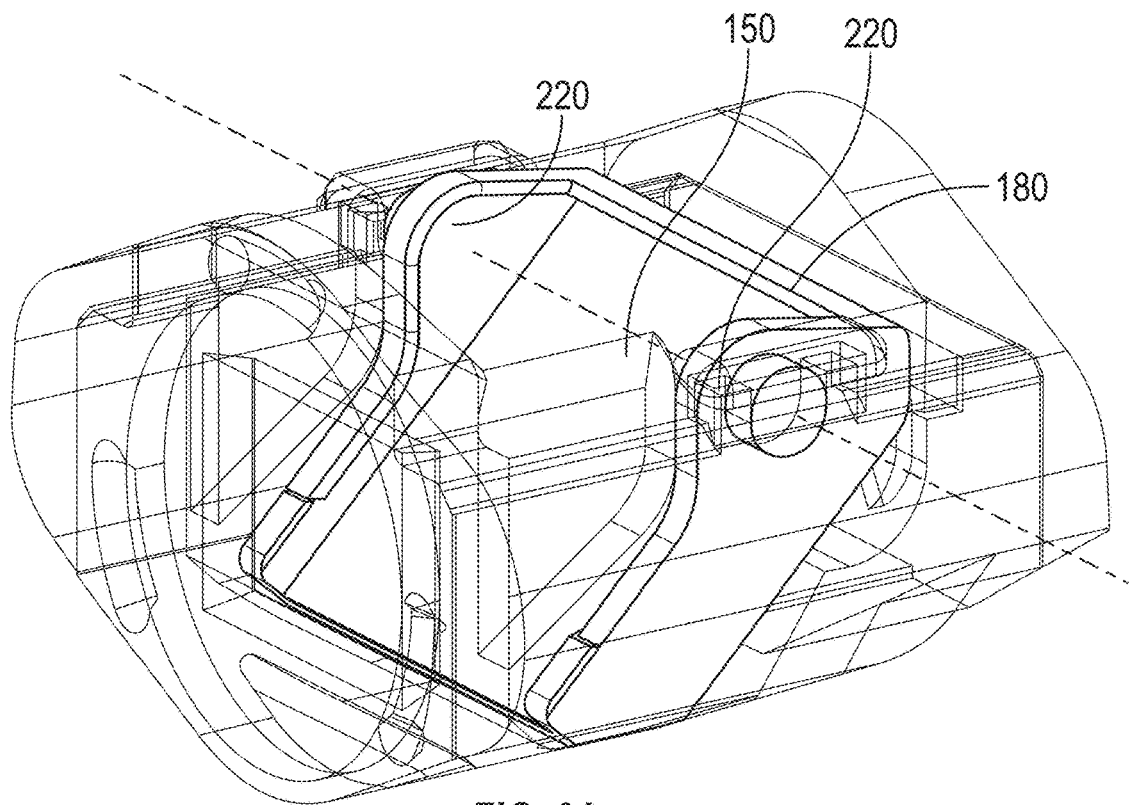
FIG. 6a is a perspective view of the OPFE mounted on the second sub-assembly.
Figure 6B:
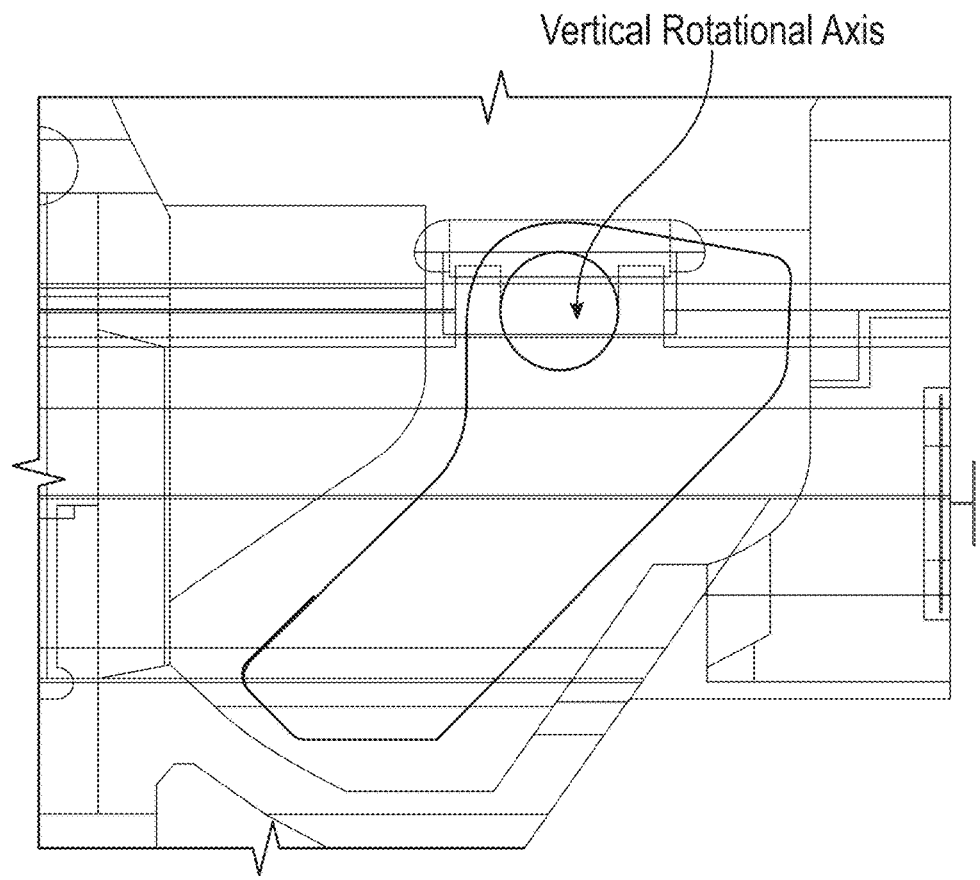
FIG. 6b is a side view of the OPFE mounted on the second sub-assembly.

In the embodiment of FIG. 8, the at least one lens 160 is received within the actuator assembly housing 310, and passes through the second aperture 145 and also partially into the second aperture 145-sa of the first sub-assembly 175. The lens 160 is shown in an end portion 123 of the lens actuator, which may have suitable length. Thus, on the same scale, the distance B has been substantially reduced compared to that of conventional mirror swing assemblies as shown in FIG. 3.

Further, it can be seen that the second aperture 145 is located non-centrally within the housing 310.

First sliding mechanism 205 and second sliding mechanism 195 are partially shown as circles representing ball bearings in receiving grooves. These provide rotational movement between the first sub-assembly 175 and housing 310.

Figure 9A:
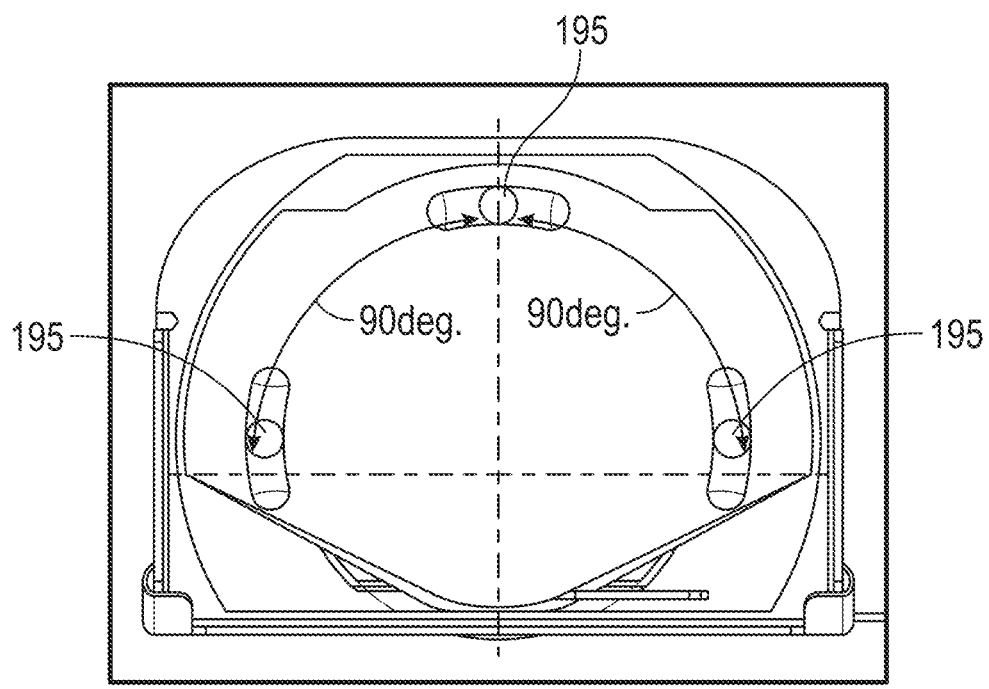
FIGS. 9a and 9b are end views of possible implementations of the first sub-assembly of the according to the disclosure.

FIGS. 9a illustrates an end-on view of the first sub-assembly 175 and the second sliding mechanism 195.

Figure 9B:
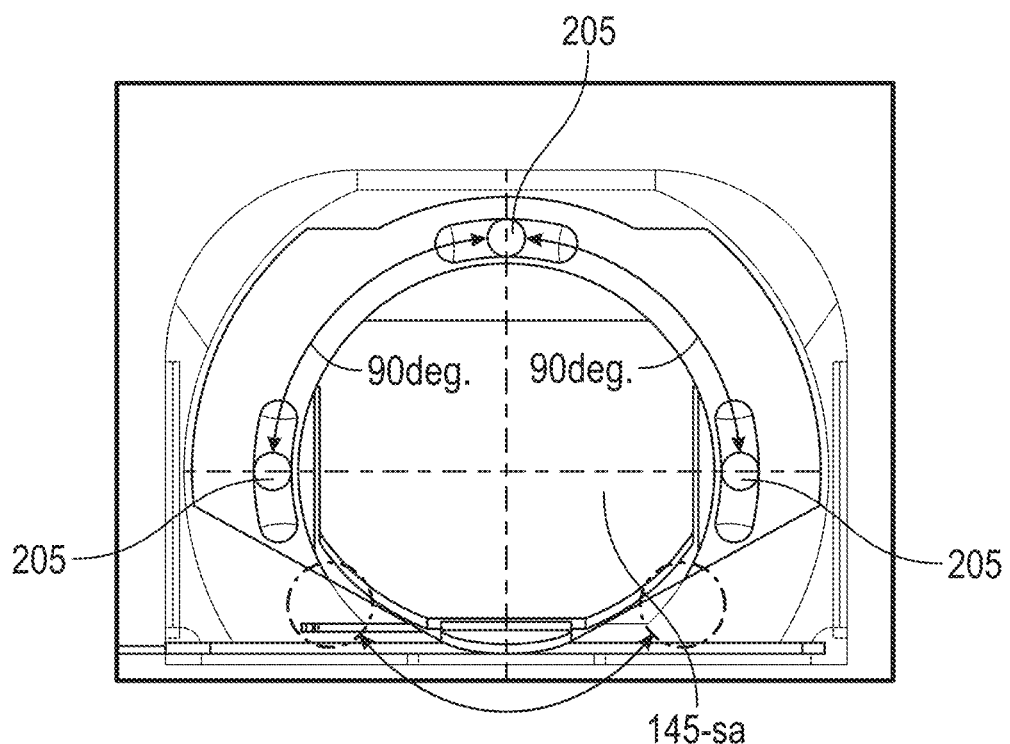

FIG. 9b illustrates the other end-on view of the first sub-assembly 175 and the first sliding mechanism 205.

For both of the first and second sliding mechanisms, three sets ball bearings are shown as located centrally in their grooves around an arc segment, and spacing approximately 90 degrees from each other.

FIG. 9b also illustrates for comparison purposes a 120 degree position around the same path as the arc segment. These are marked as two solid black circles. However, to save space and material and thus reduce height, the arc segment does not exist substantially beyond the end of the two grooves. Thus the arc segment shown just occupies over 180 degrees of arc, at most. The lower side of the arc segment is an opening. The person skilled in the art will be able to realize variations of this extent of occupation and different compatible shapes and extents of the arc segment.

Also visible in FIG. 9b is the non-rectangular shape of the second aperture 145-sa of the second sub-assembly, which enables more flexibility in design and access to the OPFE 150.

Further, the shape of the interior surface may allow a part of an end portion of the lens actuator to be received within.

Figure 10:
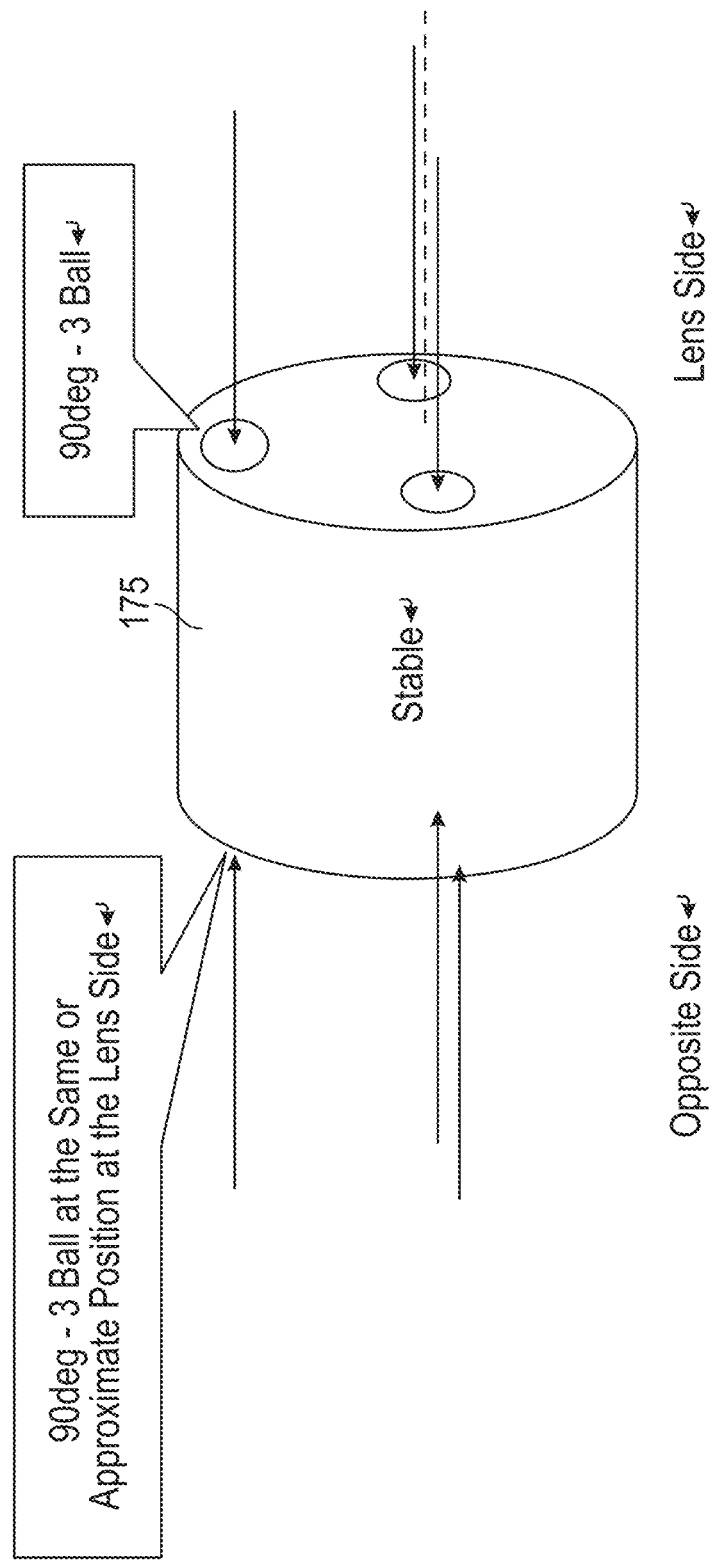
FIG. 10 is a simplified model of the first sub-assembly illustrating force-balancing.

FIG. 10 illustrates how the first sliding mechanism and the second sliding mechanism form mirror images on each end of the first sub-assembly 175, shown schematically as a cylinder.

Figure 11A:
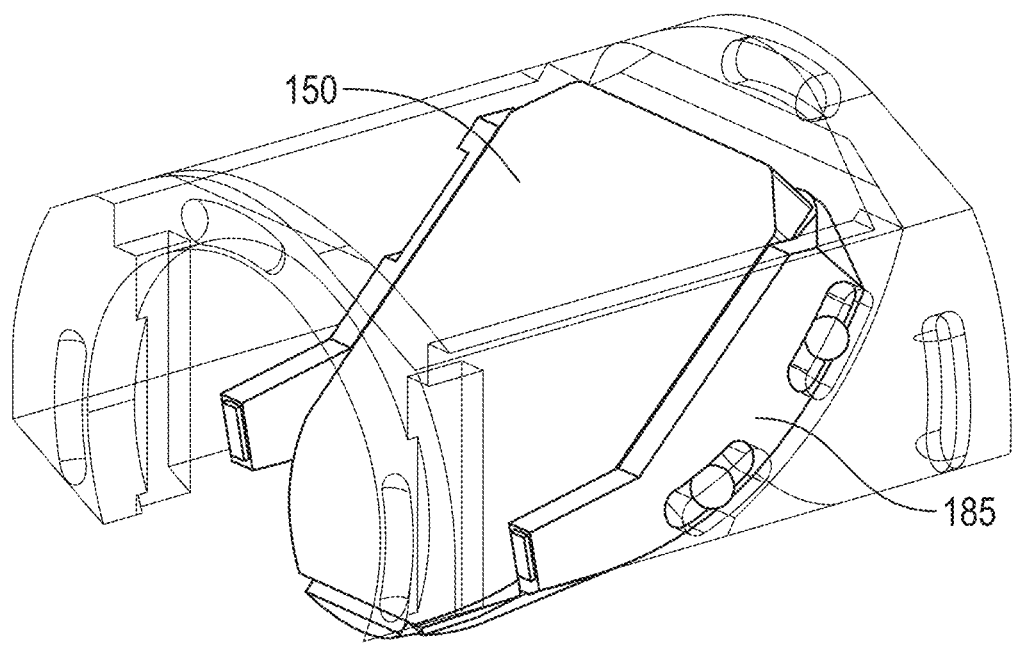
FIG. 11a is a perspective view of a possible implementation of the second sub-assembly of the according to the disclosure.
Figure 11B:
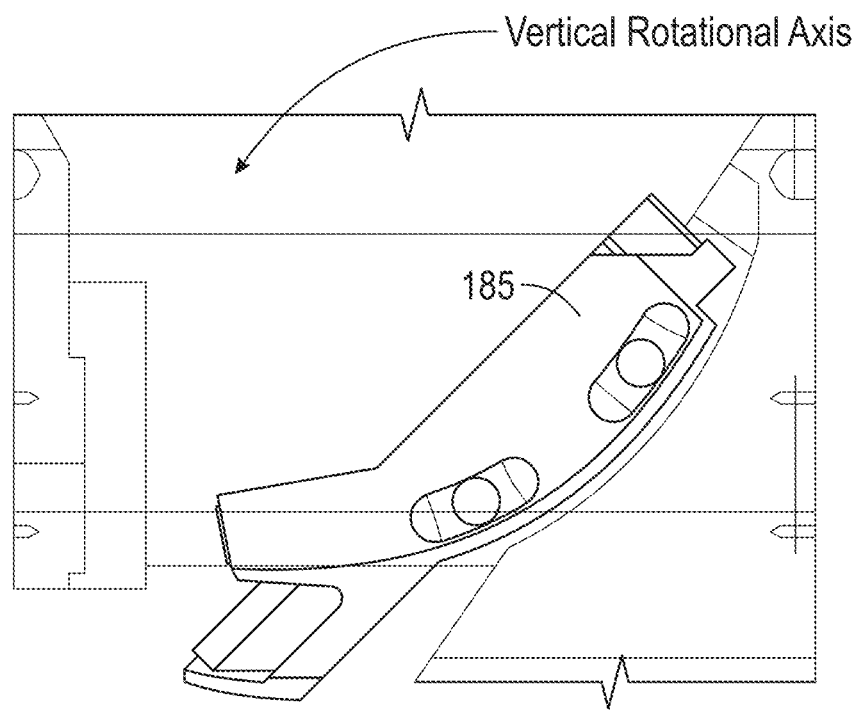
FIG. 11b is a side view of a possible implementation of the second sub-assembly of the according to the disclosure.

FIGS. 11a and 11b illustrate the second sub-assembly 185 and OPFE 150, and a possible positioning and location relationship to the vertical rotation axis. There is no connection with the vertical rotation axis.

Substantially no parts of the holder-type structure of the second sub-assembly 185 protrude above the OPFE 150, thus reducing unwanted reflections. The holder-type structure is substantially planar on the side receiving the OPFE, and has a curved section or structure on the rear side for enabling sliding movement along a segment of arc of the first sub-assembly as shown.

Figure 13:
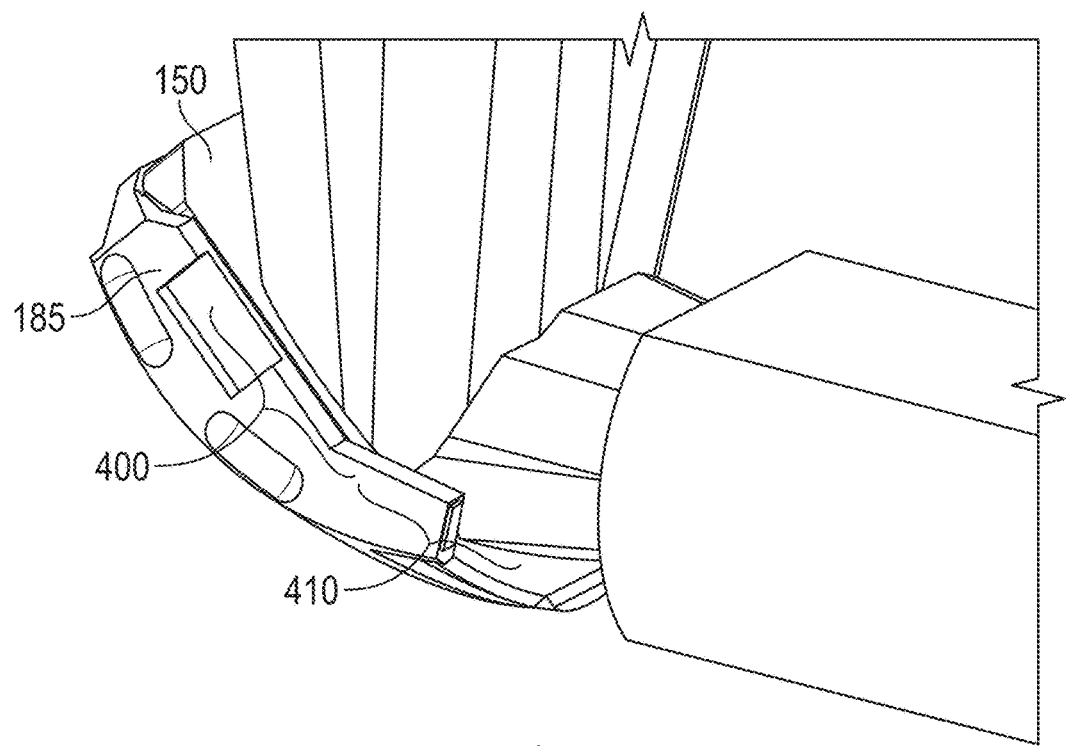
FIGS. 13 and 14 illustrate folding of incoming light rays by the OPFE.
Figure 14:
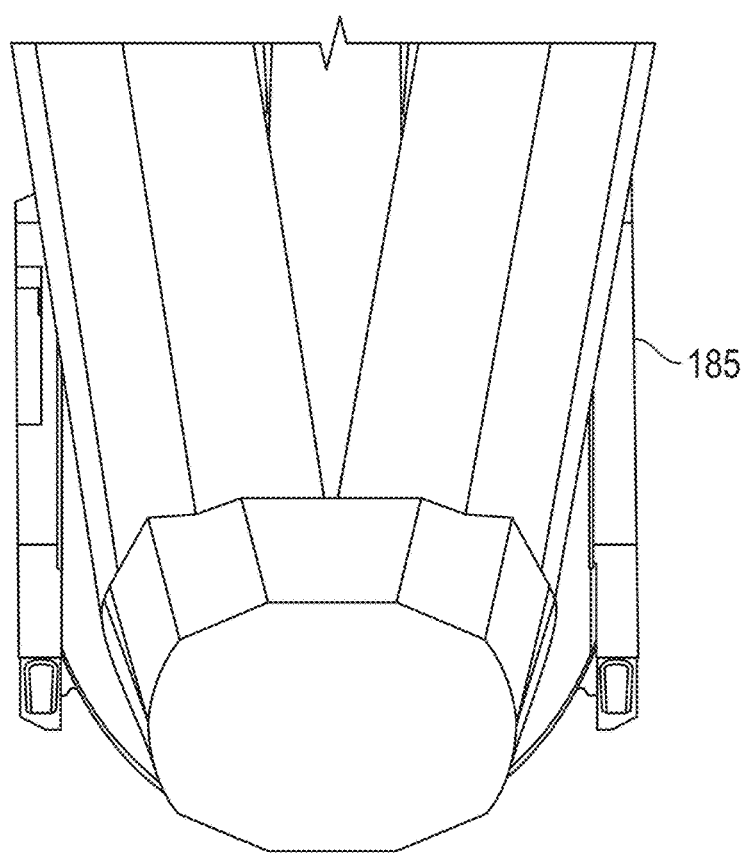

Optional end-stops are also shown for limiting mechanical movement. These may protrude. These are located adjacent an area of the OPFE which plays little role in receiving and folding light rays i.e. a non-active area. Active areas 400 and non-active areas 410 are illustrated in FIGS. 13 and 14.

FIG. 12 shows four cut-away perspective views of the OPFE when sliding between maximum extends of vertical swing movement.

An aperture 350 in a rear side of the first sub-assembly for accommodating one end of the OPFE is visible. Part of the housing 310 may also be recessed to also accommodate movement of the OPFE.

Further, it can be seen that the first sub-assembly comprises a base portion on which the second sub-assembly is mounted, two lateral arms extending towards the second aperture, which are joined around an upper side by a segment of arc.

The objectives, technical solutions, and beneficial effects of the present invention are further described in detail in the foregoing specific implementations. It should be understood that the foregoing descriptions are merely the specific implementations of the present invention, but are not intended to limit the protection scope of the present invention. The above specific implementations may be combined, and optional features not implemented. Any modification, equivalent replacement, improvement, or the like made based on the technical solutions of the present invention shall fall within the protection scope of the present invention.

The invention claimed is:

1. An actuator assembly comprising:
   a housing comprising:
      a height side comprising a first side, wherein the first side defines an opening, wherein the opening comprises a surrounding frame having an upper rim and a lower rim, and wherein a first height of the upper rim is greater than a second height of the lower rim;
      an optical path folding element (OPFE) configured to fold light rays of a field of view to provide folded light rays;
      a first aperture configured for passing the light rays to the OPFE; and
      a second aperture comprising the opening and configured for passing the folded light rays from the OPFE and for accommodating an end portion of an optical actuator; and
   a first sub-assembly coupled to the housing and configured for mounting the OPFE and providing movement for the OPFE.

2. The actuator assembly of claim 1, wherein the first sub-assembly is mounted on the actuator assembly and configured to be rotatable relative to the housing and about an axis of the second aperture.

3. The actuator assembly of claim 2, wherein the housing further comprises a cavity that extends along the axis into the housing and away from the second aperture, and wherein the cavity is configured to accommodate the end portion.

4. The actuator assembly of claim 3, wherein the cavity has a size or a shape configured for positioning at least one lens within the end portion in proximity to the OPFE when the end portion is accommodated within the cavity.

5. The actuator assembly of claim 2, further comprising a first sliding mechanism located in a region between a first interface zone of the first sub-assembly and a second interface zone of the housing, wherein the first sliding mechanism is configured to mount and rotate the first sub-assembly about the axis.

6. The actuator assembly of claim 5, wherein the region is outside the second aperture and in proximity to an inner edge surface of the second aperture.

7. The actuator assembly of claim 5, wherein the region is outside the second aperture such as at least one lens of the end portion is located in a same plane or inwardly of the first sliding mechanism when the end portion is accommodated within the second aperture.

8. The actuator assembly of claim 5, wherein the first interface zone comprises an arc segment of the first sub-assembly that at least partially accommodates the end portion.

9. The actuator assembly of claim 1, wherein the first sub-assembly comprises a receiving member that has a first size and a first shape which complement a second size and a second shape of the end portion.

10. The actuator assembly of claim 9, wherein the first size and the first shape are further configured to partially accommodate the end portion.

11. The actuator assembly of claim 1, wherein the second aperture is closer to a second side of the housing that is opposite to the first aperture.

12. The actuator assembly of claim 5, further comprising a second sliding mechanism configured for mounting and rotating the first sub-assembly about the axis of the second aperture, wherein the second sliding mechanism is located between the housing and an end of the first sub-assembly that is spaced from the first sliding mechanism.

13. The actuator assembly of claim 12, wherein the first sliding mechanism or the second sliding mechanism comprises at least three pivot points.

14. The actuator assembly of claim 13, wherein each pivot point comprises a ball bearing and a respective interfacing groove, and wherein the at least three pivot points are distributed, with approximately equal spacing, around an arc segment of the first sub-assembly.

15. The actuator assembly of claim 14, wherein the arc segment extends by approximately 180 degrees about the axis, and wherein the at least three pivot points are distributed around the arc segment with approximately 90-degree intervals.

16. The actuator assembly of claim 12, wherein the first sliding mechanism comprises at least three first pivot points, and wherein the second sliding mechanism comprises at least three second pivot points that are mirror images to the at least three first pivot points.

17. The actuator assembly of claim 1, wherein the first sub-assembly comprises a second sub-assembly configured for mounting the OPFE, wherein the second sub-assembly is mounted and slidable on and relative to the first sub-assembly along a path that forms a segment of an arc, and wherein a rotational axis of the segment is perpendicular to an axis of the second aperture.

18. The actuator assembly of claim 17, wherein the first sub-assembly or the second sub-assembly is configured to provide the rotational axis without a physical connection to the rotational axis.

19. The actuator assembly of claim 17, further comprising a sliding mechanism located at each side of the second sub-assembly and between the first sub-assembly and the second sub-assembly, wherein the sliding mechanism is configured to mount and slide the second sub-assembly on and relative to the first sub-assembly.

20. An apparatus comprising:
an actuator assembly comprising:
  a housing comprising:
    a height side comprising a first side, wherein the first side defines an opening, wherein the opening comprises a surrounding frame having an upper rim and a lower rim, and wherein a first height of the upper rim is greater than a second height of the lower rim;
    an optical path folding element (OPFE) configured to fold light rays of a field of view to provide folded light rays;
    a first aperture configured for passing the light rays to the OPFE; and
    a second aperture comprising the opening and configured for passing the folded light rays from the OPFE and for accommodating an end portion of an optical actuator; and
  a first sub-assembly coupled to the housing and configured for mounting the OPFE and providing movement for the OPFE; and
a lens actuator configured to receive the folded light rays from the second aperture.

* * * * *